United States Patent [19]
Ito et al.

[11] Patent Number: 6,052,734
[45] Date of Patent: Apr. 18, 2000

[54] METHOD AND APPARATUS FOR DYNAMIC DATA RATE CONTROL OVER A PACKET-SWITCHED NETWORK

[75] Inventors: Yoshihiro Ito, Saitama; Hidetoshi Yokota; Masami Ishikura, both of Tokyo; Tooru Asami, Saitama, all of Japan

[73] Assignee: Kokusai Denshin Denwa Kabushiki Kaisha, Tokyo, Japan

[21] Appl. No.: 09/024,914

[22] Filed: Feb. 17, 1998

[30] Foreign Application Priority Data

May 3, 1997 [JP] Japan .................................. 9-065594

[51] Int. Cl.⁷ .................................................. G06F 13/00
[52] U.S. Cl. .......................... 709/235; 709/232; 709/233; 370/229; 370/231
[58] Field of Search ..................... 709/103, 104, 709/105, 207, 223, 224, 225, 226, 229, 232, 233, 234, 235, 236, 237; 370/229, 230, 231, 232, 235, 390, 432

[56] References Cited

U.S. PATENT DOCUMENTS

| | | | |
|---|---|---|---|
| 4,910,765 | 3/1990 | Matsuse et al. | 379/100.09 |
| 5,457,687 | 10/1995 | Newman | 370/232 |
| 5,553,061 | 9/1996 | Waggener, Jr. et al. | 250/491.1 |
| 5,602,841 | 2/1997 | Lebizay et al. | 370/413 |
| 5,675,576 | 10/1997 | Kalampoukas et al. | 370/232 |

*Primary Examiner*—Viet D. Vu
*Attorney, Agent, or Firm*—Westman, Champlin & Kelly, P.A.

[57] ABSTRACT

An amount of data to be distributed to each receiving terminal is dynamically controlled for each receiving terminal in response to a congestion of each of plural receiving terminals. When a determination of an RR (Reception Report) returned from the receiving terminal results in a very low rate of packet loss, an adaptive control mixer distributes communication data transmitted from a transmitting terminal to the receiving terminal without reducing the communication data. On the other hand, the determination of the RRs returned from the receiving terminals results in a high rate of packet loss, for example, 50% and 90%, respectively. In this case, the adaptive control mixer reduces, for example, 50% of the communication data transmitted from the transmitting terminal and then distributes the data to the one receiving terminal. The adaptive control mixer reduces, for example, 90% of the communication data and then distributes the data to the other receiving terminal.

6 Claims, 5 Drawing Sheets

METHOD AND APPARATUS FOR DYNAMIC DATA RATE CONTROL OVER A PACKET-SWITCHED NETWORK

BACKGROUND OF THE INVENTION

1. Field of the Invention

The present invention relates to an intermediate system connected to a packet-switched real time communication network and for relaying communication data transmitted from a single transmitting terminal and for distributing the communication data to a plurality of receiving terminals and a method of controlling a relay. More specifically, the present invention relates to an intermediate system for dynamically controlling an amount of data per unit time of the communication data to be distributed to each receiving terminal in response to a congestion in each receiving terminal and a method of controlling a relay.

2. Description of the Related Art

A demand for transmitting/receiving real time information such as a television conference via a network has been recently increased. As a protocol for transmitting a sound, an image or the like at a real time on a TCP/IP (Transmission Control Protocol/Internet Protocol) network, attention is paid to an RTP (Real time Transport Protocol) and an RTCP (RTP Control Protocol).

In case of the television conference or the like, the connection thereof is accomplished in the form of a point (a single transmitting terminal) to-multi-point (a plurality of receiving terminals), that is, a multi-cast communication. However, in an environment in which various networks are interconnected to one another, all users cannot accomplish a communication in the same environment. Most of connection networks are a resource shared LAN which shares resource locally. Thus, the networks do not ensure that they can always use a constant network resource.

A plurality of receiving terminals sometimes include the receiving terminal connected to the network via a relatively low-speed communication circuit such as a public telephone circuit and the receiving terminal connected to the network via a relatively high-speed communication circuit such as Ethernet. However, in the conventional multi-cast communication, the transmitting terminal cannot control such that a transmission speed of communication data is changed for each receiving terminal. Therefore, when a congestion is caused in the network and the receiving terminal, even if the congestion is partially generated, the transmitting terminal performs a congestion control for reducing an amount of data to be transmitted. Thus, the amount of data to be transmitted to other receiving terminals, in which the congestion is not caused, is also reduced in a uniform manner. This causes a deterioration of communication quality. Disadvantageously, this causes an unnecessary degradation of the sound and an image quality.

In order to solve such a problem, in the RTP, an intermediate system (mixer) for making the communication in various environments possible is defined. The conventional mixer is provided with a function for decoding/re-encoding and relaying the received data. When the communication data transmitted from the transmitting terminal is decoded/re-encoded, for the high-communicability receiving terminal, the received communication data is not reduced but processed and distributed to the receiving terminal. On the other hand, for the low-communicability receiving terminal, the communication data transmitted from the transmitting terminal is partially discarded and the amount of the communication data to be distributed is reduced, whereby the congestion and a packet loss is prevented.

As described above, a real time communication requires the congestion control in order not to deteriorate the congestion in the network and a rate of packet loss. In the prior art using the above-described mixer, the congestion control is only statically performed in accordance with a physical capability such as the capability of the receiving terminal itself or the network itself. A dynamic control is not performed in accordance with the actual congestion, the actual packet loss or the like.

However, the congestion, the packet loss or the like is dynamically varied not only in response to the physical capability of the receiving terminal or the like but also in response to a load of CPU mounted in each receiving terminal, a use condition of the network or the like. Therefore, it is difficult for a static congestion control alone based on the physical capability of the receiving terminal or the like to effectively prevent the congestion, the packet loss or the like from occurring and deteriorating.

SUMMARY OF THE INVENTION

It is an object of the present invention to provide an intermediate system for dynamically controlling an amount of data to be distributed to each receiving terminal for each receiving terminal in response to a congestion of each of plural receiving terminals and a method of controlling a relay, in the intermediate system connected to a packet-switched real time communication network and for relaying communication data transmitted from a single transmitting terminal and for distributing the communication data to a plurality of receiving terminals.

In order to achieve the above object, the present invention is characterized by that the following means are provided.

(1) In an intermediate system for relaying communication data transmitted from a single transmitting terminal and for distributing the communication data to a plurality of receiving terminals, the intermediate system comprises: environment detecting means for detecting an environment of each receiving terminal which is dynamically changed; data processing means for processing the received communication data for each receiving terminal to which the communication data is to be distributed; and distributing means for distributing the processed communication data to the corresponding receiving terminal, wherein the data processing means dynamically limits an amount of data per unit time of the communication data to be distributed to each receiving terminal in response to the detected change in the environment of each receiving terminal.

(2) In a relay controlling method for relaying communication data transmitted from a single transmitting terminal and for distributing the communication data to a plurality of receiving terminals, the method comprises the steps of: detecting an environment of each receiving terminal which is dynamically changed; and dynamically limiting an amount of data per unit time of the communication data to be distributed to each receiving terminal for each receiving terminal in response to the detected environment of each receiving terminal.

According to the above-described intermediate system and relay controlling method, the amount of the communication data to be distributed to each receiving terminal can be dynamically controlled in response to the congestion of each receiving terminal. It is thus possible to effectively prevent the congestion, a packet loss or the like from occurring and deteriorating.

DETAILED DESCRIPTION OF THE PREFERRED EMBODIMENTS

Figure 1:
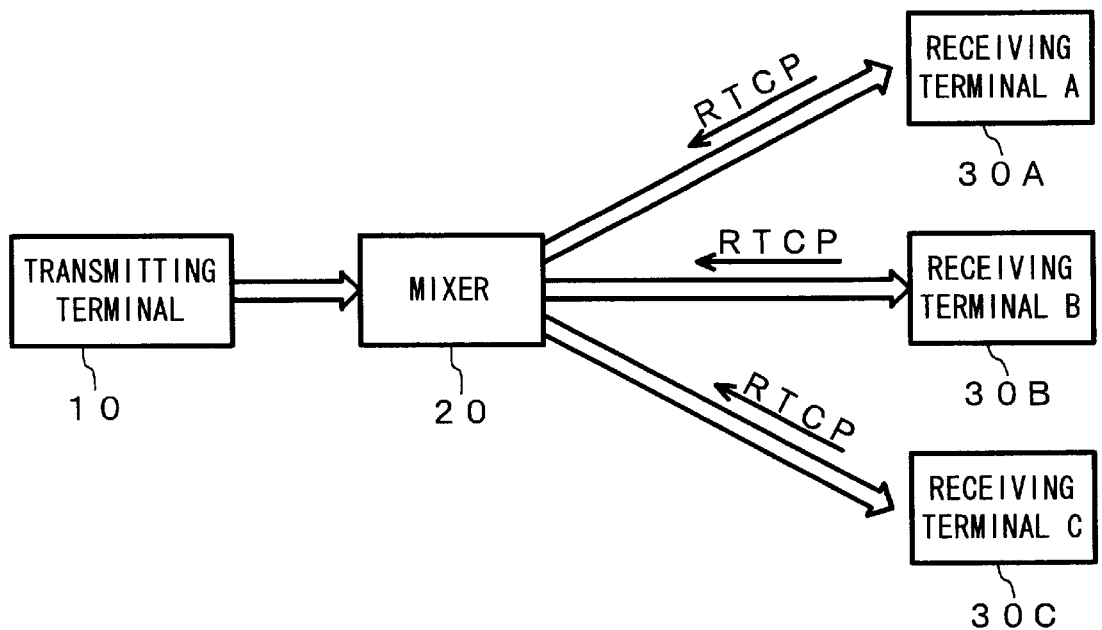
FIG. 1 is a schematic diagram of a main operation of the present invention.
Figure 2:
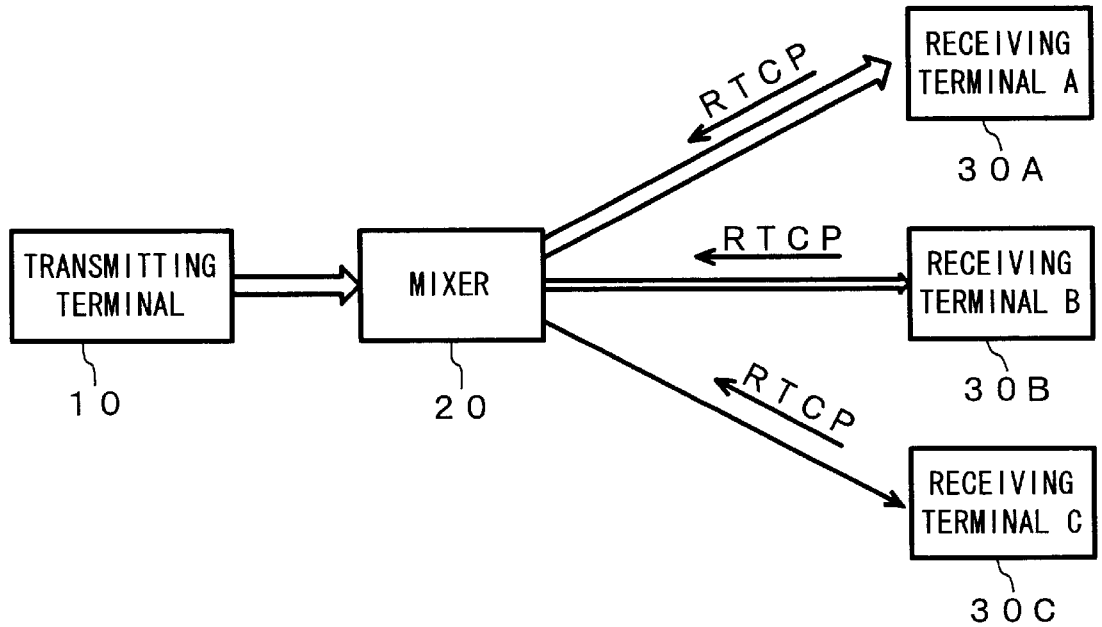
FIG. 2 is a schematic diagram of the main operation of the present invention.
Figure 7:
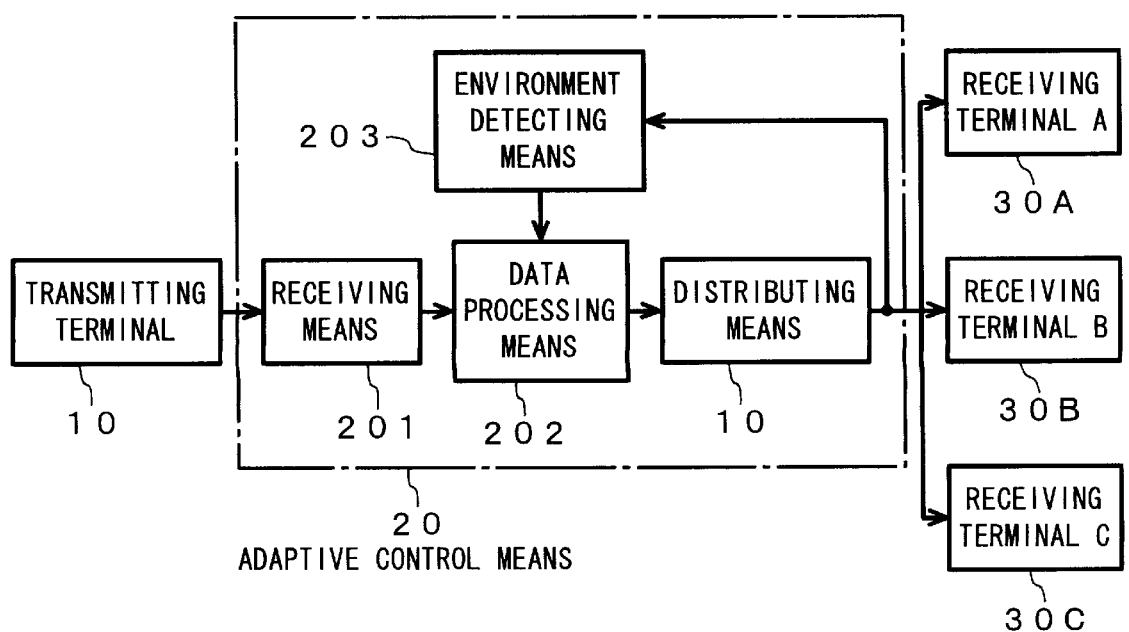
FIG. 7 is a block diagram showing an arrangement of the present invention.

The present invention will be described below in detail with reference to the accompanying drawings. FIG. 7 is a block diagram showing a basic arrangement of the present invention. FIGS. 1 and 2 schematically show an operation of the arrangement shown in FIG. 7. Communication data transmitted from a transmitting terminal 10 onto a network is inputted to an adaptive control mixer 20 characteristic of the present invention. The communication data is then distributed to receiving terminals 30A, 30B and 30C.

As shown in FIG. 7, the adaptive control mixer 20 of the present invention comprises receiving means 201 for receiving the communication data transmitted from the transmitting terminal 10; environment detecting means 203 for detecting an environment of the receiving terminals 30A–30C which are dynamically changed, for example, a congestion of each receiving terminal; data processing means 202 for processing the received communication data for each receiving terminal in response to a change in the environment of each receiving terminal and for dynamically limiting an amount of data per unit time of the communication data to be distributed to each receiving terminal; and distributing means 204 for distributing the processed communication data to the corresponding receiving terminals 30A–30C.

The receiving terminals 30A, 30B, 30C register a difference between a sequence number of a packet to be received and the sequence number of the actually received packet in an RR (Reception Report). An RTCP packet of the RR is returned to the adaptive control mixer 20. The environment detecting means 203 determines the congestion of each receiving terminal in accordance with the returned RR. The environment detecting means 203 informs the data processing means 202 of a determination result. The more serious the congestion of the receiving terminal is, the more the data processing means 202 reduces the amount of the communication data to be transmitted to the receiving terminal.

In FIGS. 1 and 2, a thickness of arrows connecting the mixer 20 and the receiving terminals 30A–30C represents the amount of data per unit time of the communication data to be distributed. When the congestion is not caused in any receiving terminals, as shown in FIG. 1, the communication data transmitted from the transmitting terminal 10 is distributed to the receiving terminals 30A, 30B, 30C without reduced.

As shown in FIG. 2, when a determination of the RR returned from the receiving terminal 30A results in a very low rate of packet loss, the adaptive control mixer 20 distributes the communication data transmitted from the transmitting terminal 10 to the receiving terminal 30A without reducing the communication data. The determination of the RRs returned from the receiving terminals 30B and 30C results in a high rate of packet loss, for example, 50% and 90%, respectively. In this case, the adaptive control mixer 20 reduces, for example, 50% of the communication data transmitted from the transmitting terminal 10 and then distributes the data to the receiving terminal 30B. The adaptive control mixer 20 reduces, for example, 90% of the communication data and then distributes the data to the receiving terminal 30C.

According to such an arrangement, the amount of data per unit time of the communication data to be distributed to each receiving terminal can be dynamically controlled in response to the congestion of the receiving terminals 30A, 30B, 30C. Thus, it is possible to effectively prevent the congestion, the packet loss or the like from occurring and deteriorating.

Figure 3:
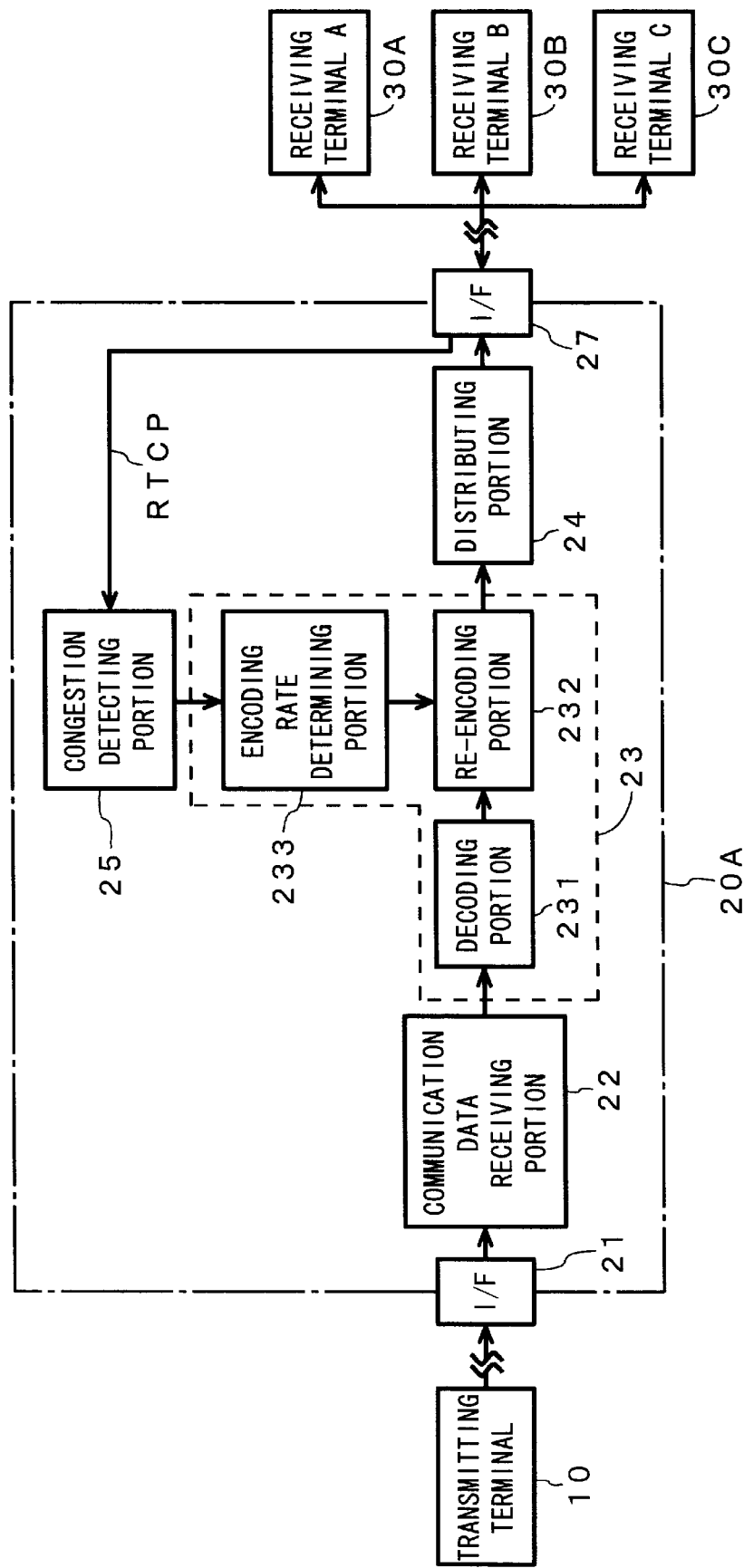
FIG. 3 is a function block diagram of a first embodiment of the present invention.

FIG. 3 is a function block diagram showing the arrangement of a main portion of an adaptive control mixer 20A according to a first embodiment of the present invention. The same reference numerals as described above represent the same or the corresponding portions.

The communication data is encoded and transmitted from the transmitting terminal 10 onto the network. The communication data inputted through an interface 21 is received by a communication data receiving portion 22 used as the receiving means 201. The received communication data is taken into a data processing portion 23 used as the data processing means 202. The data processing portion 23 comprises a decoding portion 231 for decoding the encoded communication data; an encoding rate determining portion 233 for determining an encoding rate in response to the congestion of each receiving terminal for each receiving terminal to which the communication data is to be distributed; and a re-encoding portion 232 for encoding the decoded communication data, at the determined encoding rate, for each receiving terminal to which the communication data is to be distributed.

A congestion detecting portion 25 used as the environment detecting means 203 receives the RTCP packet of the reception report (RR) returned from the receiving terminals 30A–30C through an interface 27. The congestion detecting portion 25 detects the congestion, which is one of the environments of the receiving terminals 30A–30C, in accordance with the rate of packet loss or the like determined from the this RR.

The encoding rate determining portion 233 sets a high encoding rate for the communication data to be distributed to the receiving terminal in which the congestion is not caused or the congestion is caused to such an extent that a problem does not arise even if it is caused.

On the contrary, the encoding rate determining portion 233 sets a low encoding rate for the communication data to be distributed to the receiving terminal in which the serious congestion is caused. The re-encoding portion 232 is informed of the determined encoding rate. The re-encoding portion 232 encodes the communication data to be distributed to each receiving terminal at the encoding rate of which the re-encoding portion 232 is informed for each of the receiving terminals 30A–30C. A distributing portion 24 used as the distributing means 204 distributes the encoded communication data to the receiving terminals 30A 30C.

Figure 4:
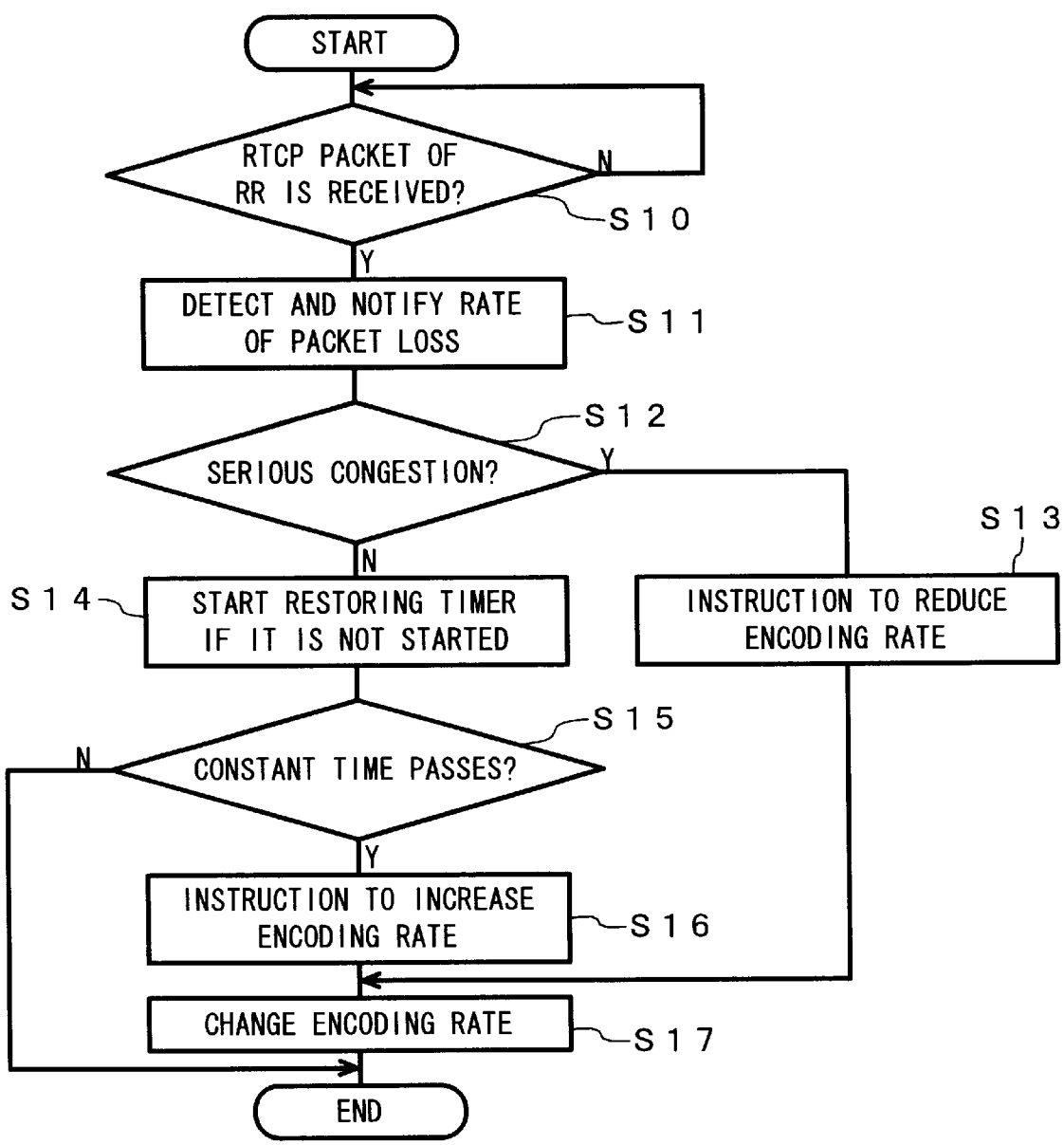
FIG. 4 is a flow chart of the operation shown in FIG. 3.

The operation of the embodiment will be described below in detail with reference to a flow chart. FIG. 4 is a flow chart showing the operation of the main portion of the adaptive control mixer 20A. In step S10, the RTCP packet of the RR is received by the congestion detecting portion 25. In this case, in step S11, the rate of packet loss is determined in accordance with the RR and the encoding rate determining portion 233 is then informed of the determined rate of packet loss. In step S12, the congestion is determined for each receiving terminal in accordance with the rate of packet loss of which the encoding rate determining portion 233 is informed. If the congestion is determined to be serious, in step S13, the encoding rate determining portion 233 issues an instruction, indicating that the encoding rate should be reduced so as to thereby reduce the amount of data, to the re-encoding portion 232. Alternatively, the re-encoding portion 232 is informed of a specific lower encoding rate by the encoding rate determining portion 233.

In step S12, made is a determination in which the congestion is not caused or the congestion is caused to such an extent that the problem does not arise even if it is caused. In this case, in step S14, a restoring timer is started if it is not started. In step S15, a reference is made to the restoring timer. If a predetermined time passes, in step S16, the encoding rate determining portion 233 issues the instruction, indicating that the encoding rate should be increased so as to thereby increase the amount of data, to the re-encoding portion 232. Alternatively, the re-encoding portion 232 is informed of a specific higher encoding rate by the encoding rate determining portion 233. In step S17, the encoding rate in the re-encoding portion 232 is changed for each receiving terminal in response to a notification result.

According to the embodiment, the congestion of the receiving terminals 30A–30C is detected. The communication data transmitted from the transmitting terminal 10 is encoded and distributed at the encoding rate in response to the congestion for each receiving terminal. That is, since the communication data encoded at the high encoding rate is distributed to the receiving terminal in which the congestion is not caused, a high-quality communication can be performed. On the other hand, since the communication data encoded at the low encoding rate is distributed to the receiving terminal in which the congestion is caused, the congestion can be canceled.

In the above-mentioned embodiment, the encoding rate is changed in the re-encoding portion 232 so as to thereby control the amount of data per unit time of the communication data to be distributed to each receiving terminal. However, as long as a JPEG coding compression is adopted, a high-frequency component may be discarded during a DCT conversion so as to thereby reduce the amount of data. When an MPEG coding compression is adopted, the most important I-picture alone or the I-picture and the second most important P-picture alone, in three types of coding frames (an I-picture, a P-picture and a B-picture), are distributed to the receiving terminal in which the serious congestion is caused, whereby the amount of data may be reduced.

Figure 5:
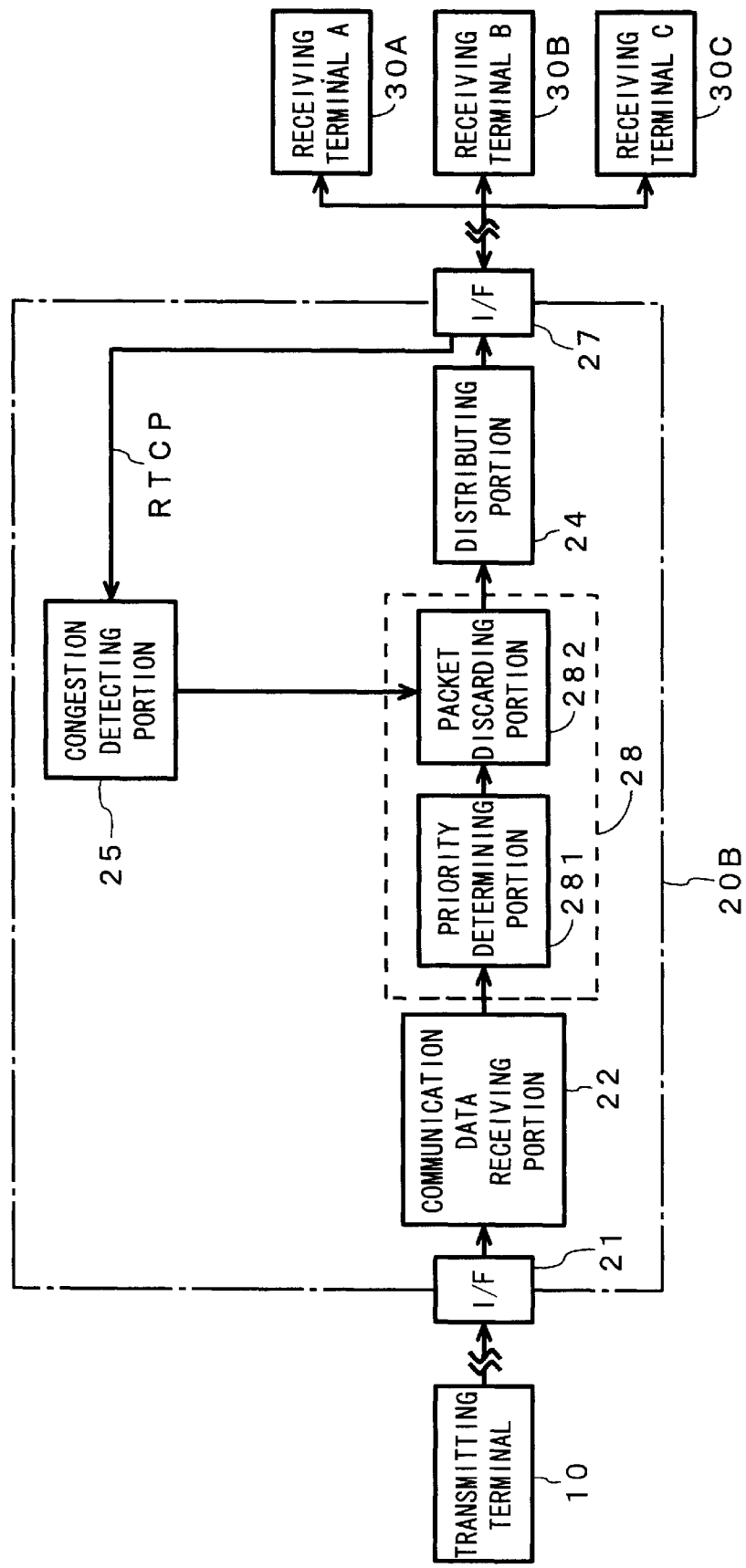
FIG. 5 is a function block diagram of a second embodiment of the present invention.

FIG. 5 is a function block diagram showing the arrangement of the main portion of an adaptive control mixer 20B according to a second embodiment of the present invention. The same reference numerals as described above represent the same or the corresponding portions.

In this embodiment, a data processing portion 28 used as the data processing means 202 comprises a priority determining portion 281 for determining a priority of each packet in accordance with an identification code added to each packet of the communication data transmitted from the transmitting terminal 10; and a packet discarding portion 282 for reducing the amount of data by discarding a lowpriority packet in response to the congestion detected by the congestion detecting portion 25 for each receiving terminal to which the communication data is to be distributed.

Figure 6:
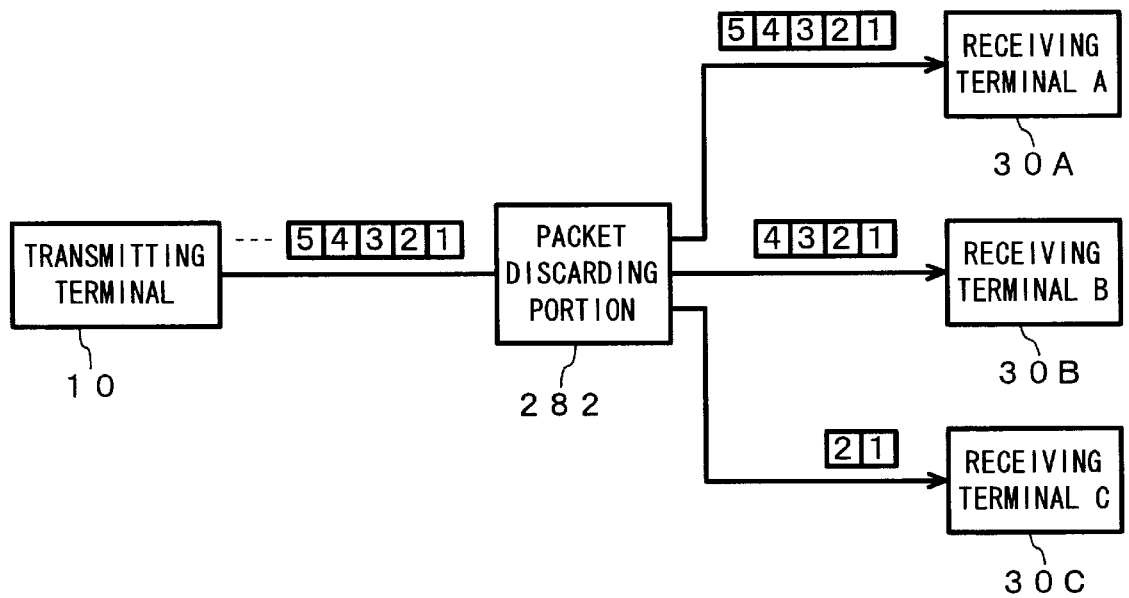
FIG. 6 is a schematic diagram of the operation of a packet discarding portion 282.

FIG. 6 is a schematic diagram of the operation of the packet discarding portion 282. By the priority determining portion 281, identification numbers 1 through 5 indicating a degree of importance are added to the packets transmitted from the transmitting terminal 10 to the network. The packet having the added identification number 1 is the most important. The more the identification number is increased, the less the importance is. The packet having the added identification number 5 means that a loss of this packet has little influence on a communication quality such as a sound quality and an image quality.

Assuming that the congestion is not caused in a receiving terminal A, a little congestion is caused in a receiving terminal B and the serious congestion is caused in a receiving terminal C, the packet discarding portion 282 distributes all the packets 1 through 5 transmitted from the transmitting terminal 10 to the receiving terminal A. The packet discarding portion 282 discards the lowestpriority packet 5 and then distributes the packets 1 through 4 alone to the receiving terminal B. The packet discarding portion 282 discards the three lower-priority packets 3, 4, 5 and then distributes the two higherpriority packets 1 and 2 alone to the receiving terminal C.

According to this embodiment, since the communication data transmitted from the transmitting terminal is not reduced but distributed to the receiving terminal in which no congestion is caused, the high-quality communication can be performed. On the other hand, since the less-important/low-priority packet is discarded and the communication data is then distributed to the receiving terminal in which the congestion is caused, the congestion is canceled.

According to the present invention, the following effects are achieved.

(1) Since the communication data encoded at the high encoding rate is distributed to the receiving terminal in which no congestion is caused, the high-quality communication can be performed. On the other hand, since the communication data encoded at the low encoding rate is distributed to the receiving terminal in which the congestion is caused, the congestion can be canceled.

(2) Since the communication data transmitted from the transmitting terminal is not reduced but distributed to the receiving terminal in which no congestion is caused, the high-quality communication can be performed. On the other hand, since the less important packet is discarded and the communication data having a small amount of data is then distributed to the receiving terminal in which the congestion is caused, the congestion is canceled.

What is claimed is:

1. An intermediate system connected to a packet-switched real time communication network and for relaying communication data transmitted from a single transmitting terminal and for distributing the communication data to a plurality of receiving terminals, said intermediate system comprising:

receiving means for receiving the communication data transmitted from the transmitting terminal;

environment detecting means for detecting an environment of each receiving terminal which is dynamically changed;

data processing means for processing the communication data received by said receiving means, in response to a change in the environment of each receiving terminal detected by said environment detecting means, for each receiving terminal to which the communication data is to be distributed; and distributing means for distributing the communication data processed by said data processing means to the corresponding receiving terminal, wherein said data processing means dynamically limits an amount of data per unit time of the communication data to be distributed to each receiving terminal in response to the change in the environment of each receiving terminal.

2. The intermediate system according to claim 1, wherein said environment detecting means detects a congestion of each receiving terminal, and said data processing means reduces the amount of data per unit time of the communication data to be distributed to each receiving terminal in response to the congestion of each receiving terminal.

3. The intermediate system according to claim 2, wherein said congestion is detected in accordance with a rate of packet loss reported from each receiving terminal.

4. The intermediate system according to claim 1, wherein said data processing means includes:

decoding means for decoding the communication data encoded transmitted from the transmitting terminal;

re-encoding means for again encoding the communication data decoded by said decoding means; and encoding rate determining means for determining, in response to said detected environment, an encoding rate of said re-encoding means for each receiving terminal to which the communication data is to be distributed.

5. The intermediate system according to claim 1, wherein said data processing means includes:

priority determining means for determining a priority of each packet in accordance with an identification code added to each packet of the communication data transmitted from the transmitting terminal; and packet discarding means for discarding a lowpriority packet in response to the congestion of each receiving terminal for each receiving terminal to which the communication data is to be distributed.

6. In a packet-switched real time communication network, a relay controlling method for relaying communication data transmitted from a single transmitting terminal and for distributing the communication data to a plurality of receiving terminals, said method comprising the steps of:

detecting an environment of each receiving terminal which is dynamically changed; and dynamically limiting an amount of data per unit time of the communication data to be distributed to each receiving terminal for each receiving terminal in response to the environment detected by said environment detecting step.

* * * * *